United States Patent [19]

Kitamoto et al.

[11] Patent Number: 4,513,054

[45] Date of Patent: Apr. 23, 1985

[54] MAGNETIC RECORDING MEDIUM

[75] Inventors: Tatsuji Kitamoto; Goro Akashi, both of Odawara, Japan

[73] Assignee: Fuji Photo Film Co., Ltd., Minami-ashigara, Japan

[21] Appl. No.: 585,020

[22] Filed: Mar. 5, 1984

Related U.S. Application Data

[63] Continuation of Ser. No. 375,683, May 6, 1982, abandoned.

[30] Foreign Application Priority Data

May 7, 1981 [JP] Japan .................................. 56-67641

[51] Int. Cl.³ .............................................. H01F 10/02
[52] U.S. Cl. ................................... 428/329; 428/336; 428/469; 428/693; 428/694; 428/697; 428/699; 428/900
[58] Field of Search ................................ 427/127–132, 427/48; 428/695, 328, 694, 329, 900, 336, 928, 469, 693, 697, 699; 252/62.54

[56] References Cited

U.S. PATENT DOCUMENTS 3,859,129 1/1975 Chen et al. ...................... 148/108 X
4,237,506 12/1980 Manly ................................. 360/135
4,265,931 5/1981 Tamai et al. ..................... 427/130 X

*Primary Examiner*—Bernard D. Pianalto
*Attorney, Agent, or Firm*—Armstrong, Nikaido Marmelstein & Kubovcik

[57] ABSTRACT

In a magnetic recording medium comprising a non-magnetic support and two or more magnetic recording layers containing ferromagnetic particles dispersed in a non-magnetic binder, the ferromagnetic particles of the outermost magnetic layer are given a main magnetic anisotropy by a magnetic annealing treatment and the direction of the magnetic anisotropy is vertical to the recording surface. Thus, the vertical magnetization recording is improved.

15 Claims, No Drawings

MAGNETIC RECORDING MEDIUM

This is a continuation of application Ser. No. 375,683 filed May 6, 1982 abandoned.

BACKGROUND OF THE INVENTION

1. Field of the Invention

This invention relates to a magnetic recording medium and more particularly, it is concerned with an improved magnetic recording medium having an S/N ratio increased in high density recording.

2. Description of the Prior Art

Up to the present time, various trials have been made to increase the recording density of a magnetic tape (relative speed of tape and head/maximum frequency of recording signal) from the requirements as to the high fidelity in audio cassettes and the low speed in small-sized video tape recorders. In these trials, for example, it is proposed to increase the coercive force of a magnetic layer, to increase simultaneously the residual magnetization and coercive force as in metallic cassettes or to arrange a magnetic layer with a high coercive force as an upper layer to increase the output at a high recording density with preventing the output at a low recording density from lowering.

Lately the thought of vertical magnetization recording has been introduced to use effectively the residual magnetization component in the vertical direction to the surface of a magnetic recording medium. It is said that according to this vertical magnetization recording, the recording density as defined above becomes high, the output decrease due to self-demagnetization (decrease of the residual magnetization by a self-demagnetization field acting in a direction to negative the self-magnetization between N and S poles formed by the self residual magnetization, which is increased with the decrease of the distance between the N and S poles) is not so large if the recording wavelength is smaller than the thickness of a magnetic layer, and the high density recording is effective with a recording wavelength of 1-2 microns or less. As a medium for the vertical magnetization recording, there have been used at present materials capable of being readily magnetized in the vertical direction, such as sputtered film of Co-Cr alloy, and two layer structures having a magnetizable layer of a permalloy with a coercive force under this layer, which have, however, disadvantages in material and operation.

In magnetic recording media with magnetic layers of coating type, utilization of a slant or vertical magnetization component, not in parallel with the magnetic surface, has been proposed as described in, for example, U.S. Pat. Nos. 3,185,775 and 3,052,567 and Japanese Patent Publication No. 15203/1974. However, these methods have the drawbacks that the noise level is still high and the output is low.

A magnetic tape having a two layer structure using acicular magnetic particles with a large length/width ratio has hitherto been known wherein in the lower layer, the particles are oriented in parallel with the surface of the support and in the upper layer, they are oriented vertically to the surface to thus raise the short wavelength sensitivity. In practice, however, it is difficult to stand the acicular particles vertically in a step of coating and drying the particles and rather, the acicular particles tend to fall down to be in parallel with the surface with the decrease of the thickness due to vaporization of a solvent during drying. This tendency is increased with the degree of anisotropy, i.e. with the increase of the length/width ratio.

SUMMARY OF THE INVENTION

It is an object of the present invention to provide a magnetic recording medium whereby the above described drawbacks of the prior art can be overcome.

It is another object of the present invention to provide a magnetic recording medium having a high S/N ratio in a high recording density.

It is a further object of the present invention to provide an improved magnetic recording tape excellent in output property.

These objects can be attained by a magnetic recording medium comprising a non-magnetic support and two or more magnetic recording layers superposed thereon in which ferromagnetic particles are dispersed in a binder, characterized in that the ferromagnetic particles of the outermost magnetic layer are given a main magnetic anisotropy by a magnetic annealing treatment and the direction of the magnetic anisotropy is vertical to the recording surface.

DETAILED DESCRIPTION OF THE INVENTION

The inventors have noticed that particles are given a uniaxial anisotropy by magnetic annealing in addition to the shape anisotropy and this technique is available for a magnetic recording medium with a multilayer structure in such a manner that the direction of the magnetic anisotropy by magnetic annealing be vertical to a recording surface, and have reached the present invention.

That is to say, the present invention provides a magnetic recording medium comprising a non-magnetic support and two or more magnetic recording layers containing ferromagnetic particles dispersed in a binder, in which the ferromagnetic particles of the outermost magnetic layer are given a main magnetic anisotropy in the vertical direction to the recording surface by a magnetic annealing treatment. Preferably, the ferromagnetic particles are cubic particles with a length/width ratio of 2 or less.

In the outermost magnetic layer of the present invention, ferromagnetic particles are subjected to a magnetic annealing treatment which consists in placing a ferromagnetic powder in a magnetic field at a high temperature and cooling gradually while applying the magnetic field thereto, whereby to give a uniaxial magnetic anisotropy in the direction of the applied magnetic field, as described in Soshin Chikakado: "Kyojiseitai no Butsuri (Physics of Ferromagnetic Substance)" page 254-267, published September, 1959 by Shokabo.

As a material capable of exhibiting a magnetic annealing effect, various materials are known such as ferrites, Fe-Co, Fe-Ni alloys and the like, and in particular, Co-doped ferrites show a more remarkable magnetic annealing effect. Those containing Co in a proportion of 0.3 to 30% have a higher coercive force in proportion to the content of Co and exhibit a magnetic annealing effect at a relatively low temperature, e.g. 200°-300° C. or less, whereby the magnetic anisotropy appears under ambient conditions at room temperature. In the magnetic annealing, Co-doped ferrites ranging from $Co_xFe^{++}{}_{(1-x)}Fe_2{}^{+++}O_4$ (x=0.003-0.6) to $Co_xFe^{+++}{}_{(2-x)}O_{3-x/2}$ (x=0.005-0.4) by controlling $Fe^{++}$ have been proposed in which a part of Co, $Fe^{++}$ and $Fe^{+++}$ can be replaced by other metals such as Mn, and these ferrites can also be used in the present invention.

The size of a particle to be subjected to a magnetic annealing treatment is preferably 2 microns or less and the shape thereof is not particularly limited. For the purpose of improving the S/N ratio in a high recording density, however, the particle size is preferably 0.3 micron or less and the shape thereof is preferably oval to cubic with a length/width ratio of about 1.

The temperature and period of time for effecting a magnetic annealing treatment depend upon the amounts of Co, $Fe^{++}$ and other additives and the history of a product, but in general, they can respectively be determined experimentally so as to increase the squareness ratio (Br/Bm) of BH curve. In the ordinary use, e.g. tapes often used at room temperature, it is desirable that the temperature for magnetic annealing is 50°-300° C., since if lower than 50° C., the merit achieved by the magnetic annealing effect according to the present invention tends to be decreased with the passage of time.

Usually, the magnetic annealing treatment is carried out under powdered state and thereafter, the treated powder is dispersed in a binder, coated and then subjected to an orientation treatment in the vertical direction to the surface. However, the magnetic annealing treatment can be carried out while applying a magnetic field vertical to the surface of a magnetic recording medium after coated and dried.

The magnetic annealing treatment according to the present invention is preferably carried out under the following conditions:
(a) temperature: 50°-300° C.
(b) cooling speed: gradual, e.g. about 1° C./min
(c) strength of magnetic field: more than coercive force, e.g. at least 500 gauss
(d) time to hold temperature (a): 10 min-1 hr In the present invention, the magnetic orientation treatment of ferromagnetic particles in the vertical direction to a recording surface is effectively carried out in a DC magnetic field by a permanent magnet, electromagnet or solenoid optionally with superposing an AC magnetic field or with using jointly ultrasonic wave.

The lower magnetic layer of the present invention has a coercive force similar to or less than that of the uppermost magnetic layer and is oriented so as to be magnetized in a recording direction, i.e. longitudinally in general, but circumferentially in the case of a disk-shaped magnetic recording medium. The magnetic powder used in the lower layer is so chosen that the reproducing output at a low recording density (such that the minimum unit of recording exceeds approximately the thickness of the upper layer) may be held high. To this end, particles having a length of more than 0.3 micron and a large length/width ratio are preferably used, but of course, it is possible to use particles which are given a large magnetic anisotropy by the effect of a magnetic annealing treatment and oriented in a recording surface or recording direction. In this case, the particles need not always have a large length/width ratio.

As apparent from the foregoing illustration, three or more magnetic recording layers can be provided in the magnetic recording medium of the present invention.

Useful examples of the ferromagnetic particles used in the lower layer of the present invention are ferromagnetic fine powders of $\gamma\text{-}Fe_2O_3$, Co-doped $\gamma\text{-}Fe_2O_3$, $Fe_3O_4$, Co-doped $Fe_3O_4$, Co-doped $Fe_3O_4$, Berthollide compounds of $\gamma\text{-}Fe_2O_3$ and $Fe_3O_4$ ($FeO_x$: $1.33 < x < 1.50$), Co-doped Berthollide compounds of $\gamma\text{-}Fe_2O_3$ and $Fe_3O_4$ ($FeO_x$: $1.33 < x < 1.50$), $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys. In addition, the ferromagnetic particles used in the outermost layer can be also used in the lower layer.

In the present invention, a non-magnetic binder for dispersing ferromagnetic particles and a support should be made of materials capable of resisting a high temperature, in general, 100° to 300° C. required for a magnetic annealing treatment.

Suitable binders which can be used in the present invention include hitherto known thermoplastic resins, thermosetting resins and mixtures thereof.

Suitable thermoplastic resins are those which have a softening point of about 150° C. or lower, a mean molecular weight of about 10,000 to 200,000 and a degree of polymerization of about 200 to 2,000, for example, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, acrylate-styrene copolymers, methacrylate-acrylonitrile copolymers, methacrylate-vinylidene chloride copolymers, methacrylate-styrene copolymers, urethane elastomers, polyvinyl fluoride, vinylidene chloride-acrylonitrile copolymers, butadiene-acrylonitrile copolymers, polyamide resins, polyvinyl butyral, cellulose derivatives such as cellulose acetate butyrate, cellulose diacetate, cellulose triacetate, cellulose propionate, cellulose nitrate and the like, styrene-butadiene copolymers, polyester resins, chlorovinyl ether-acrylate copolymers, amino resins, various synthetic rubber based thermoplastic resins and mixtures thereof. Examples of these resins are described in Japanese Patent Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972 and 27886/1973, U.S. Pat. Nos. 3,144,352, 3,419,420, 3,499,789, 3,713,887, etc.

Suitable thermosetting resins have a molecular weight of about 200,000 or less as a coating solution and when heated after coating and drying, the molecular weight becomes infinity due to reactions such as condensation, addition and the like. Of these resins, preferred resins are those which do not soften or melt before the resin thermally decomposes. Representative examples of these resins are phenol resins, epoxy resins, polyurethane hardening type resins urea resins, melamine resins, alkyd resins, silicone resins, acryl based reactive resins, epoxy-polyamide resins, mixtures of high molecular weight polyester resins and isocyanate prepolymers, mixtures of methacrylic acid salt copolymer and diisocyanate prepolymers, mixtures of polyesterpolyols and polyisocyanates, ure-formaldehyde resins, mixtures of low molecular weight glycols, high molecular weight diols and triphenylmethane triisocyanates, polyamide resins and mixtures thereof, etc. Examples of these resins are described in, for example, Japanese Patent Publication Nos. 8103/1964, 9779/1965, 7192/1966, 8016/1966, 14275/1966, 18179/1967, 12081/1968, 28023/1969, 14501/1970, 24902/1970, 13103/1971, 22065/1972, 22066/1972, 22067/1972, 22072/1972, 22073/1972, 28045/1972, 28048/1972 and 28922/1972, U.S. Pat. Nos. 3,144,353, 3,320,090, 3,437,510, 3,597,273, 3,781,210 and 3,781,211, etc. These binders can be used individually or in combination with each other and other additives can be added to the binders. The mixing ratio by weight of a ferromagnetic powder and a binder is 10 to 400 parts by weight, preferably 30 to 200 parts by weight of the binder to 100 parts by weight of the ferromagnetic powder.

In addition to the above described binder and ferromagnetic fine powder, other additives such as dispersing agents, lubricants, abrasives, antistatic agents and the like can be added to the magnetic recording layer.

Suitable dispersing agents are fatty acids containing about 12 to 18 carbon atoms represented by the general formula $R_1COOH$ wherein $R_1$ is an alkyl group containing about 11 to 17 carbon atoms, for example, caprylic acid, capric acid, lauric acid, muristic acid, palmitic acid, stearic acid, oleic acid, elaidic acid, linolic acid, linolenic acid, stearolic acid and the like; metallic soaps comprising the alkali metal (Li, Na, K etc.) salts or the alkaline earth metal (Mg, Ca, Ba, etc.) salts of the above described fatty acids; and lecithin, etc. In addition, higher alcohols containing about 12 or more carbon atoms and the sulfates thereof can be used. These dispersing agents are generally used in a proportion of about 1 to 20 parts by weight per 100 parts by weight of a binder. These dispersing agents are described in Japanese Patent Publication Nos. 28369/1964, 17945/1969 and 15001/1973 and U.S. Pat. Nos. 3,387,993 and 3,470,021.

Suitable lubricants which can be used in the present invention include silicone oils, carbon black, graphite, carbon black graft polymers, molybdenum disulfide, tungsten disulfide, fatty acid esters produced from a monocarboxylic acid containing about 12 to 16 carbon atoms and a monohydric alcohol containing about 3 to 12 carbon atoms, fatty acid esters produced from a monocarboxylic fatty acid containing about 17 or more carbon atoms and a monohydric alcohol in which the total number of carbon atoms ranges from about 21 to 23 and the like. These lubricants are generally used in a proportion of about 0.2 to 20 parts by weight per 100 parts by weight of a binder. These lubricants are described in Japanese Patent Publication No. 23889/1968, Japanese Patent Application Nos. 28647/1967 and 81543/1968, U.S. Pat. Nos. 3,470,021, 3,492,235, 3,497,411, 3,523,086, 3,625,760, 3,630,772, 3,634,253, 3,642,539 and 3,687,725, IBM Technical Disclosure Bulletin, Vol. 9, No. 7, page 779 (December 1966), and ELECTRONIK, No. 12, page 380 (1961), West Germany.

Typical abrasive agents which can be used in the present invention include fused alumina, silicon carbide, chromium oxide, corundum, diamond, synthetic diamond, garnet, emery (main component: corundum and magnetite) and the like. These abrasive agents have generally a mean particle size of 0.05 to 5 microns, preferably 0.1 to 2 microns and are generally added in a proportion of 1 to 10 parts by weight to 100 parts by weight of the magnetic powder. Examples of the abrasives are described in Japanese Patent Application No. 26749/1973, U.S. Pat. Nos. 3,007,807, 3,041,196, 3,293,066, 3,630,910 and 3,687,725, British Pat. No. 1,145,349, West German Pat. No. 853,211 and 1,001,000.

Antistatic agents which can be used in the present invention include electrically conductive powders such as graphite, carbon black and carbon black graft polymers; natural surface active agents such as saponin; nonionic surface active agents such as alkylene oxide based, glycerol based and glycidol based surface active agents; cationic surface active agents such as heterocyclic compounds, e.g. higher alkylamines, quaternary ammonium salts, pyridine and the like; phosphoniums, sulfoniums and the like; anionic surface active agents containing acid groups such as carboxylic acid groups, sulfonic acid groups, phosphoric acid groups, sulfate groups, phosphate groups and the like; amphoteric surface active agents such as sulfates or phosphates of amino acids, amino sulfonic acids, amino alcohols and the like; etc.

Examples of the surface active agents which can be used as antistatic agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174 and 3,545,974, West German Patent Application (OLS) No. 1,942,665, British Pat. Nos. 1,077,317 and 1,198,450, Ryohei Oda et al., "Kaimen Kassei Zai no Gosei to so no Oyo (Synthesis of Surface Active Agents and Their Applications), Maki Shoten, Tokyo (1964), A. M. Schwrats et al., "Surface Active Agents", Interscience Publications Corp., New York (1958), J. P. Sisley et al., "Encyclopedia of Surface Active Agents", Vol. 2, Chemical Publishing Co., New York (1964), "Kaimen Kassei Zai Binran (Handbook of Surface Active Agents)", 6th Ed., Sangyo Tosho Co., Tokyo (Dec. 20, 1966), etc.

These surface active agents can be used individually or in combination with each other. These surface active agents are generally used as antistatic agents, but in some cases, they are used for other purposes, for example, for improving dispersibility, magnetic properties and lubricity, or as an auxiliary coating agent.

Formation of a magnetic recording layer is carried out by dissolving or dispersing the above described composition in an organic solvent and then coating the resulting composition onto a support.

Suitable materials which can be used for this support are various plastics, for example, polyesters such as polyethylene terephthalate, polyethylene-2,6-naphthalate and the like, polyolefins such as polypropylene and the like, cellulose derivatives such as cellolose triacetate, cellulose diacetate and the like, polycarbonates, etc., and non-magnetic metals, for example, copper, aluminum, zinc, etc. Such a non-magnetic support can have a thickness of about 3 to 100 microns, preferably 5 to 50 microns in the form of a film or sheet, and about 0.5 to 10 mm in the form of a disk or card. A cylindrical form such as drum can be used.

The above described magnetic powder, binder, dispersing agent, lubricant, abrasive agent, antistatic agent and solvent are well blended or kneaded to prepare a coating composition. For kneading, the magnetic powder and other components are charged in a kneading machine simultaneously or separately. For example, a magnetic powder is added to a solvent containing a dispersing agent, kneaded for a predetermined period of time, then mixed with other components and kneaded sufficiently to prepare a magnetic coating composition. Various kneading machines are used for the kneading and dispersing, for example, two roll mills, three roll mills, ball mills, pebble mills, trommel mills, sand grinders, Szegvari attriters, high speed impeller dispersing machines, high speed stone mills, high speed impact mills, kneaders, high speed mixers, homogenizers, ultrasonic dispersing machines, etc. The kneading and dispersing techniques are described in T. C. Patton, "Paint Flow and Pigment Dispersion", published by John Wiley & Sons (1964) and U.S. Pat. No. 2,581,414 and 2,855,156.

The foregoing magnetic recording layer can be coated on a support using coating methods such as air doctor coating, blade coating, air knife coating, squeeze coating, dip coating, reverse roll coating, transfer roll coating, gravure coating, kiss coating, cast coating, spray coating and the like, and other coating methods can also be used. These methods are described in "Coating Kogaku (Coating Engineering)", page 253 to 277, published by Asakura Shoten, Tokyo (Mar. 20, 1971).

Typical organic solvents which can be used in the coating include ketones such as acetone, methyl ethyl ketone, methyl isobutyl ketone, cyclohexanone and the like; alcohols such as methanol, ethanol, propanol, butanol and the like; esters such as methyl acetate, ethyl acetate, butyl acetate, ethyl lactate, glycol monoethyl ether acetate and the like; ethers and glycol ethers such as diethyl ether, glycol monoethyl ether, glycol dimethyl ether, dioxane and the like; aromatic hydrocarbons such as benzene, toluene, xylene and the like; chlorinated hydrocarbons such as methylene chloride, ethylene chloride, carbon tetrachloride, chloroform, ethylene chlorohydrin, dichlorobenzene and the like; etc.

The thickness of the upper layer and lower layer is suitably determined depending upon the intended use and in general, the upper layer has a thickness of 0.5 to 3 microns, while the lower layer has a thickness of 2 to 5 microns. When a ferromagnetic layer as the lower layer is provided by plating or vapor deposition, the thickness may be 0.1 to 2 microns.

The present invention will be explained in detail with reference to the following examples. It will be obvious to those skilled in the art that various changes and modifications can be made in the components, ratios, operational order and the like without departing from the spirit of the present invention. Therefore, the present invention should not be construed as being limited to the following examples.

EXAMPLE 1

266 parts by weight of ferrous sulfate and 14 parts by weight of cobalt sulfate were dissolved in 1000 parts by weight of water to prepare a solution M, 120 parts by weight of caustic soda was dissolved in 1500 parts by weight of water to prepare a solution A and 30 parts by weight of ammonium nitrate was dissolved in 100 parts by weight of water to prepare a solution OX.

The solution M and A were heated at 40° C. To the solution A stirred were added the solution M and further the solution OX, and the temperature of the mixture was increased to 80° C. The reaction was continued for about 30 minutes to obtain a Co-containing magnetite powder, which was then subjected to a heat treatment at 200° C. in nitrogen atmosphere for 1 hour and treated to 200° C. in a magnetic field of 2000 gauss for 30 minutes, followed by cooling gradually at a rate of 1° C./min.

Using the thus resulting sample, a magnetic coating liquid I was prepared according to the following recipe:

|  | parts by weight |
|---|---|
| Ferromagnetic Iron Oxide subjected to Magnetic Annealing Treatment | 100 |
| Vinyl Chloride-Vinyl Acetate Copolymer | 27 |
| Acrylic Resin | 7 |
| Carbon Black | 8 |
| Silicone Oil | 1 |
| Amyl Stearate | 0.2 |
| Methyl Ethyl Ketone | 180 |

This magnetic coating liquid I was ball milled and well dispersed, coated onto a polyethylene terephthalate base of 22μ to give a coating thickness of 5μ on dry base and passed through between poles forming a magnetic field of 800 gauss in the vertical direction, where the coated film was substantially dried by hot air, thus obtaining Sample No. 1.

On the other hand, an acicular γ-Fe$_2$O$_3$ with a length of 0.5μ and a length/width ratio of 12 commonly used for the ordinary magnetic tape was prepared and using the same, a magnetic coating liquid II was prepared according to the following recipe:

|  | parts by weight |
|---|---|
| γ-Fe$_2$O$_3$ | 100 |
| Vinyl Chloride-Vinyl Acetate Copolymer | 15 |
| Epoxy Resin | 7 |
| Polyamide Resin | 5 |
| Carbon Black | 7 |
| Oleic Acid | 1 |
| Methyl Ethyl Ketone | 200 |

This magnetic coating liquid II was coated onto a polyethylene terephthalate base of 22μ in thickness to give a coating thickness of 4μ on dry base and subjected in conventional manner to a magnetic orientation in the web in the longitudinal direction. After drying, the coated film was subjected to a calendering treatment to smoothen the surface. The magnetic coating liquid I was then coated onto the smoothened surface to give a thickness of 1μ on dry base and dried substantially in a vertical magnetic field of 800 gauss to obtain a magnetic tape (Sample No. 2).

For comparison, a magnetic coating liquid I' was prepared by the use of the acicular γ-Fe$_2$O$_3$ of the magnetic coating liquid II in the magnetic coating liquid I and coated onto a coated film of the magnetic coating liquid II with a thickness of 4μ to give a thickness of 1μ, thus obtaining a magnetic tape (Sample No. 3).

These samples were subjected to a calendering treatment again, slit in a width of ½" and subjected to measurement of the properties to obtain results as shown in Table 1.

In this table, Br/Bm ratio is a ratio of residual magnetic flux density to saturated magnetic flux density of BH curve measured in the vertical direction to the surface of a magnetic tape by means of a magnetic flux meter of sample vibration type (made by Toei Kogyo Co.), A and B are the reproducing outputs of a magnetic tape, A being the output at a short recording wavelength (relative speed of head and tape/signal frequency), i.e. 1μ and B being a ratio of the output of a signal (3 MHz) in A to the noise level at a point of 2 MHz part by 1 MHz from this signal, and C is the reproducing output at a relatively long recording wavelength, i.e. 100μ. A, B and C are respectively represented by dB unit.

TABLE 1

| Sample No. | Coating Liquid | Br/Bm in Vertical Direction | A | B | C |
| --- | --- | --- | --- | --- | --- |
| 1 (control) | Magnetic Coating Liquid I, 5μ | 0.40 | +5.5 | +5 | −6 |
| 2 | Magnetic Coating Liquid I, 1μ Magnetic Coating Liquid II, 4μ | 0.35 | +5 | +5 | +0.5 |
| 3 (control) | Magnetic Coating Liquid I', 1μ Magnetic Coating Liquid II, 4μ | 0.32 | 0 | 0 | 0 |

As is evident from Table 1, Sample No. 2 of the present invention is more excellent in all the output properties A, B and C than Sample No. 3 having the two layers in which the magnetic particles of the upper layer are not subjected to magnetic annealing and vertical orientation treatment to a recording surface and in the reproducing output at a relatively long recording wavelength than Sample No. 1 having the single layer in which the magnetic particles are subjected to magnetic annealing and vertical orientation.

EXAMPLE 2

A magnetic coating liquid having the following composition was prepared:

| | parts by weight |
| --- | --- |
| Ferromagnetic iron oxide | 100 |
| Polyamidemide Resin (Pyrodic No. 100 commercial name made by Dainippon Ink Kagaku Kogyo Co.) | 130 |
| Graphite | 10 |
| Dimethylacetamide | 200 |

As the ferromagnetic iron oxide, there were used magnetic powders X, Y and Z, X being the same as used in the magnetic coating liquid I of Example 1 and subjected to the magnetic annealing treatment of Example 1, Y being the same as X but omitting the magnetic annealing treatment and Z being the same acicular iron oxide as used in the magnetic coating liquid II of Example 1.

These compositions were charged in a ball mill and well dispersed to prepare magnetic coating liquids III, IV and V corresponding to the magnetic powder X, Y and Z.

The thus resulting magnetic coating liquid V was coated onto a support of polyimide film (Kapton-commercial name-) with a thickness of 23μ to give a thickness of 4μ on dry base, oriented in the surface and in the longitudinal direction and subjected to a calendering treatment. Then, each of the magnetic coating liquids III and IV was coated thereon to give a thickness of 1μ on dry base and for comparison, there was prepared a tape which upper layer and lower layer are of the magnetic coating liquid IV.

After drying, these tapes were rolled up, and the rolls were held at 200° C. for 1 hour and colled gradually at a cooling rate of 1° C./min while applying a magnetic field of 1000 gauss in the radius direction from the center of the roll, thus obtaining Sample Nos. 4, 5 and 6. In addition, Sample No. 7 was prepared corresponding to Sample No. 5 free from the magnetic annealing treatment after tape making. These samples were subjected to measurement of the properties in an analogous manner to Example 1 to thus obtain results as shown in Table 2:

TABLE 2

| Sample No. | Coating Liquid | Br/Bm in Vertical Direction | A | B | C |
| --- | --- | --- | --- | --- | --- |
| 4 | Magnetic Coating Liquid III, 1μ Magnetic Coating Liquid V, 4μ | 0.35 | 6.5 | 6.5 | 0 |
| 5 | Magnetic Coating Liquid IV, 1μ Magnetic Coating Liquid V, 4μ | 0.34 | 7.0 | 6.5 | −0.5 |
| 6 | Magnetic Coating Liquid IV, 5μ | 0.55 | 7.5 | 6.5 | −4 |
| 7 | Same as Sample No. 5 but omitting magnetic annealing treatment after tape making | 0.33 | 3 | 2.5 | −1 |

As is evident from Table 2, Sample Nos. 4 and 5 of the present invention are superior to Sample No. 6 having the single magnetic layer with respect to the output property at a longer recording wavelength, and it is apparent from comparison with Sample No. 7 that Sample Nos. 4 and 5 give better output properties by effecting a magnetic annealing treatment after tape making.

In the above described Examples, cubic particles containing 5% of Co were used, but the similar merits were obtained even by changing the amount of Co in a range of 0.2 to 20% to give a desired coercive force, by changing $(Fe^{++} + Co^{++})/(Fe^{+++} + Fe^{++} + Co^{++})$ ratio in a range of from 0.33 corresponding to magnetite to 0 corresponding to $\gamma$-$Fe_2O_3$ or by replacing a part of $(Fe^{++} + Co^{++})$ by Mn, Cr or other ions.

What is claimed is:

1. A magnetic recording medium comprising a nonmagnetic support and two or more magnetic recording layers superposed thereon in which ferromagnetic particles are dispersed in a binder, characterized in that the ferromagnetic particles of the outermost magnetic layer are given a main magnetic anisotropy by a magnetic annealing treatment and the direction of the magnetic anisotropy is vertical to the recording surface, the ferromagnetic particles of the outermost layer being ferrites, Fe-Co alloys and Fe-Ni alloys, and also being oval or cubic particles having a size of at most two microns and a length/width ratio of at most 2.

2. The magnetic recording medium of claim 1, wherein the ferrites are represented by $Co_xFe^{++}{}_{(1-x)}Fe_2{}^{+++}O_4$ (x=0.003–0.6) or $Co_xFe^{+++}{}_{(2-x)}O_{3-x/2}$ (x=0.005–0.4).

3. The magnetic recording medium of claim 1, wherein the ferrites contains Co in a proportion of 0.3 to 30%.

4. The magnetic recording medium of claim 1, wherein the ferromagnetic particles used in the lower layer are selected from the group consisting of particles of $\gamma$-$Fe_2O_3$, Co-doped $\gamma$-$Fe_2O_3$, $Fe_3O_4$, Co-doped $Fe_3O_4$, Berthollide compounds of $\gamma$-$Fe_2O_3$ and $Fe_3O_4$, Co-doped Berthollide compounds of $\gamma$-$Fe_2O_3$ and $Fe_3O_4$, $CrO_2$, Co-Ni-P alloys, Co-Ni-Fe alloys, Co-Ni-Fe-B alloys, Fe-Ni-Zn alloys, Fe-Mn-Zn alloys, Fe-Co-Ni-P alloys and Ni-Co alloys.

5. The magnetic recording medium of claim 1, wherein the mixing ratio by weight of the ferromagnetic particles and binder is 100 to 200 parts of the binder to 100 parts of the ferromagnetic particles.

6. The magnetic recording medium of claim 1, wherein the outermost magnetic layer has a thickness of 0.5 to 3 microns and the lower magnetic layer has a thickness of 2 to 5 microns.

7. The magnetic recording medium of claim 1, wherein the magnetic annealing treatment is carried out under powdered state, followed by dispersing the powder in a binder, coating and subjecting to an orientating treatment in the vertical direction to the surface.

8. The magnetic recording medium of claim 1, wherein the magnetic annealing treatment is carried out while applying a magnetic field vertical to the surface of the magnetic recording medium coated and dried.

9. The magnetic recording medium of claim 1, wherein the magnetic annealing treatment is carried out from a temperature of 50° to 300° C.

10. The magnetic recording medium of claim 1, wherein the lower magnetic layer has a coercive force similar to or less than that of the uppermost magnetic layer.

11. The magnetic recording medium of claim 1, wherein the magnetic powder used in the lower layer is so chosen as to keep the reproducing output high in a low recording density.

12. The magnetic recording medium of claim 11, wherein the ferromagnetic particles have a larger length/width ratio and a length of at least 0.3.

13. The magnetic recording medium of claim 1, wherein the orientation treatment is carried out in a magnetic field in the vertical direction to the surface.

14. The magnetic recording medium of claim 13, wherein the magnetic field is a DC field or AC field.

15. The magnetic recording medium of 14, wherein the magnetic field has a field strength of 500 to 2000 gauss.

* * * * *